(12) United States Patent
Kano

(10) Patent No.: US 11,570,409 B2
(45) Date of Patent: Jan. 31, 2023

(54) OPERATION APPARATUS, MULTI-APPARATUS SYSTEM, CONTROL METHOD, AND STORAGE MEDIUM

(71) Applicant: CANON KABUSHIKI KAISHA, Tokyo (JP)

(72) Inventor: Atsushi Kano, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/689,097

(22) Filed: Mar. 8, 2022

(65) Prior Publication Data

US 2022/0201260 A1 Jun. 23, 2022

Related U.S. Application Data

(63) Continuation of application No. 17/032,147, filed on Sep. 25, 2020, now Pat. No. 11,297,288.

(30) Foreign Application Priority Data

Oct. 4, 2019 (JP) .............................. JP2019-183836

(51) Int. Cl.
*H04N 9/31* (2006.01)
*G03B 21/14* (2006.01)
*G06F 3/14* (2006.01)

(52) U.S. Cl.
CPC ........... *H04N 9/3147* (2013.01); *G03B 21/14* (2013.01); *G06F 3/1446* (2013.01); *H04N 9/3179* (2013.01)

(58) Field of Classification Search
CPC .... H04N 9/3147; H04N 9/3179; G03B 21/14; G06F 3/1446
See application file for complete search history.

(56) References Cited

U.S. PATENT DOCUMENTS

| 10,373,589 B2 | 8/2019 | Ota |
| 2007/0106950 A1 | 5/2007 | Hutchinson |
| 2015/0293740 A1 | 10/2015 | Cho |
| 2019/0037181 A1 | 1/2019 | Suzuki |

(Continued)

FOREIGN PATENT DOCUMENTS

| JP | 2017161747 A | 9/2017 |
| JP | 2017169237 A | 9/2017 |
| JP | 2018037834 A | 3/2018 |

OTHER PUBLICATIONS

Extended European Search Report issued in European Appln. No. 20198668.4 dated Mar. 1, 2021.

(Continued)

*Primary Examiner* — Ryan D Howard
(74) *Attorney, Agent, or Firm* — Rossi, Kimms & McDowell LLP

(57) ABSTRACT

An operation apparatus through which a user operation is performed to control a plurality of controllable apparatuses includes a detector configured to detect the user operation, and a controller configured to acquire information on an arrangement of the plurality of controllable apparatuses and to switch a control target apparatus among the controllable apparatuses when a user operation is detected which inputs a direction corresponding to an arrangement direction of the plurality of controllable apparatuses indicated by the information on the arrangement.

11 Claims, 9 Drawing Sheets

(56) References Cited

U.S. PATENT DOCUMENTS

2019/0052849 A1   2/2019   Monden

OTHER PUBLICATIONS

GOGOI "9 Cool Tips and Tricks for Multiple Monitors on Windows 10" Guiding Tech. Nov. 22, 2017: pp. 1-14.
Office Action issued in U.S. Appl. No. 17/032,147 dated Jun. 7, 2021.
Notice of Allowance issued in U.S. Appl. No. 17/032,147 dated Dec. 8, 2021.

| ID INFORMATION | TOTAL NUMBER | ARRANGE-MENT DIRECTION Z | ARRANGE-MENT ORDER (X, Y) | ROTATION | CONNECTION DETECTION |
|---|---|---|---|---|---|
| PROJECTOR 101 | 3 | LATERAL | (1, 1) | 0 DEGREE | (1, 1) |
| PROJECTOR 201 | | | (2, 1) | 0 DEGREE | (2, 1) |
| PROJECTOR 301 | | | (3, 1) | 0 DEGREE | (3, 1) |

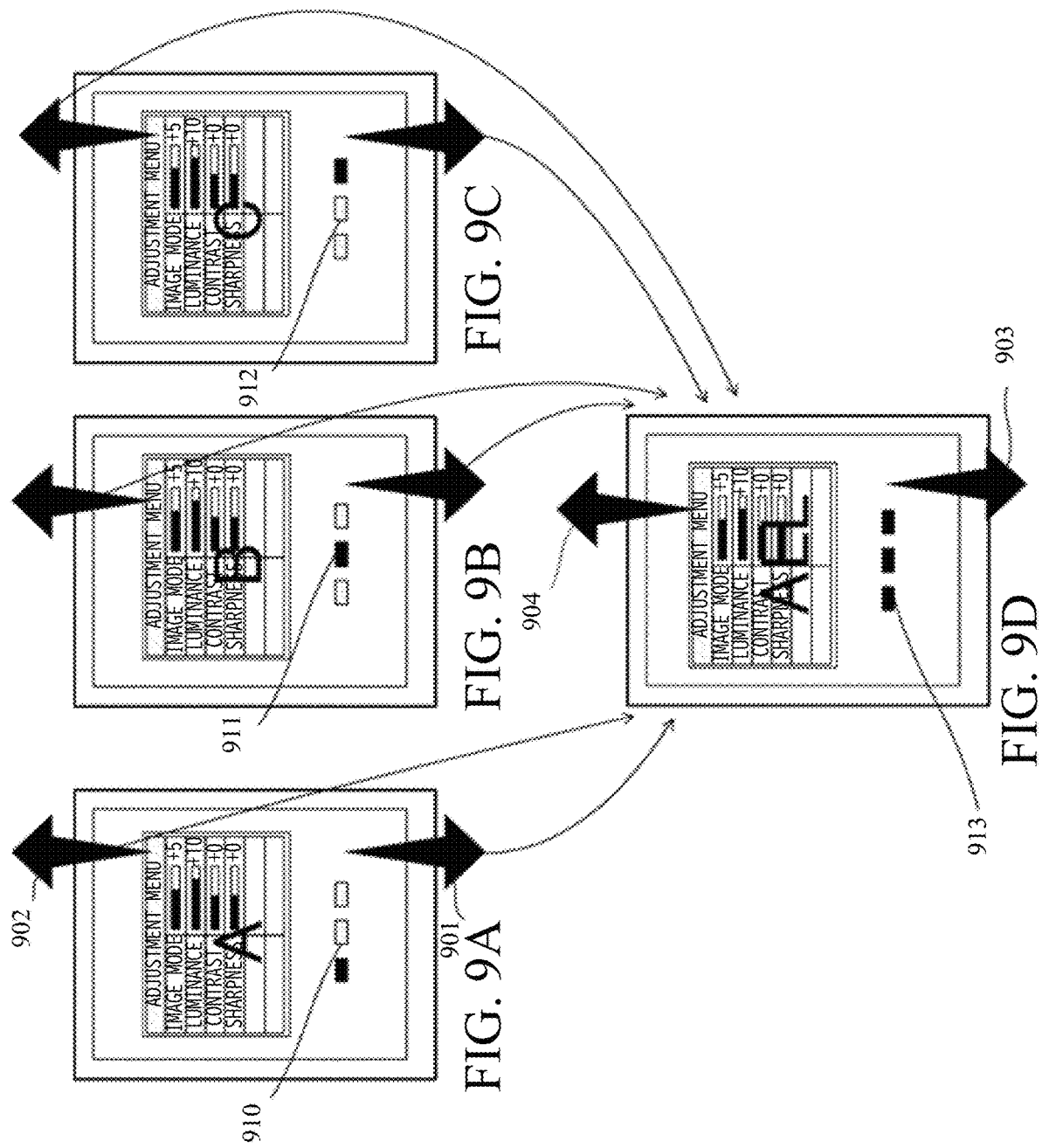

| ID INFORMATION | IP ADDRESS | TOTAL NUMBER | ARRANGEMENT DIRECTION Z | ARRANGEMENT ORDER (X, Y) | ROTATION | CONNECTION DETECTION |
|---|---|---|---|---|---|---|
| PROJECTOR 101 | 100.100.100.001 | 3 | LATERAL | (1, 1) | 0 DEGREE | (1, 1) |
| PROJECTOR 201 | 100.100.100.002 | | | (2, 1) | 0 DEGREE | (2, 1) |
| PROJECTOR 301 | 100.100.100.003 | | | (3, 1) | 0 DEGREE | (3, 1) |

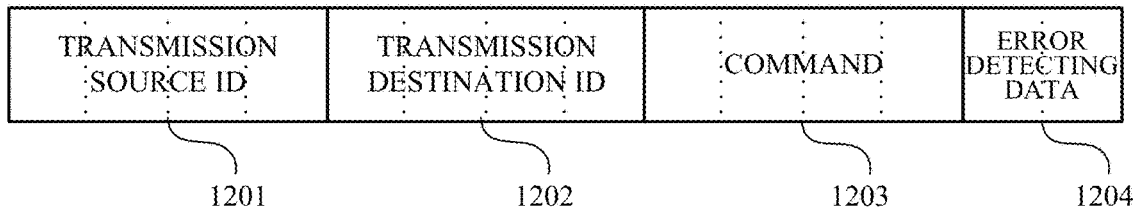
FIG. 12
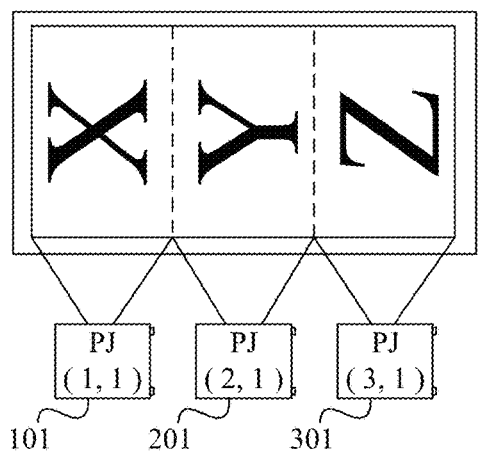
FIG. 13
| ID INFORMATION | TOTAL NUMBER | ARRANGE-MENT DIRECTION Z | ARRANGE-MENT ORDER (X, Y) | ROTATION | CONNECTION DETECTION |
|---|---|---|---|---|---|
| PROJECTOR 101 | 3 | LATERAL | (1, 1) | 90 DEGREE | (1, 1) |
| PROJECTOR 201 | | | (2, 1) | 90 DEGREE | (1, 2) |
| PROJECTOR 301 | | | (3, 1) | 90 DEGREE | (1, 3) |
FIG. 14

OPERATION APPARATUS, MULTI-APPARATUS SYSTEM, CONTROL METHOD, AND STORAGE MEDIUM

BACKGROUND OF THE INVENTION

Field of the Invention

The present invention relates to an operation of a multi-apparatuses system.

Description of the Related Art

It would be convenient if a user can control a plurality of controllable apparatuses individually or collectively by operating a single operation apparatus. For example, in displaying a large-screen image by combining a plurality of image display apparatuses (such as projectors), it is necessary to adjust the luminance and contrast of each image display apparatus, and the luminances and contrasts of all image display apparatuses collectively. Japanese Patent Laid-Open No. 2017-161747 discloses a method of displaying a menu screen that facilitates an adjustment of an individual image display apparatus in displaying an image by combining a plurality of image display apparatuses.

However, it is arduous for a user who sequentially and individually controls a plurality of controllable apparatuses, to input or set information (such as a remote control channel) necessary for a connection to a control target apparatus whenever the control target apparatus is changed.

SUMMARY OF THE INVENTION

The present invention provides an operation apparatus that can easily control a plurality of control target apparatuses.

An operation apparatus according to one aspect of the present invention through which a user operation is performed to control a plurality of controllable apparatuses includes a detector configured to detect the user operation, and a controller configured to acquire information on an arrangement of the plurality of controllable apparatuses and to switch a control target apparatus among the controllable apparatuses when a user operation is detected which inputs a direction corresponding to an arrangement direction of the plurality of controllable apparatuses indicated by the information on the arrangement.

A multi-apparatus system having the above operation apparatus also constitutes another aspect of the present invention. A control method of the above operation apparatus also constitutes another aspect of the present invention. A non-transitory computer-readable storage medium storing a computer program for causing a computer of an operation apparatus to execute the above control method also constitutes another aspect of the present invention.

Further features of the present invention will become apparent from the following description of exemplary embodiments with reference to the attached drawings.

BRIEF DESCRIPTION OF THE DRAWINGS

FIGS. 9A to 9D illustrate another example showing operations and displays of the terminal device according to the second embodiment.

FIG. 12 illustrates a communication packet according to the second embodiment.

FIG. 13 illustrates a plurality of vertically oriented and laterally arranged projectors.

FIG. 14 illustrates a projector arrangement state in the case of FIG. 13.

DESCRIPTION OF THE EMBODIMENTS

Referring now to the accompanying drawings, a description will be given of embodiments according to the present invention.

First Embodiment

Figure 1:
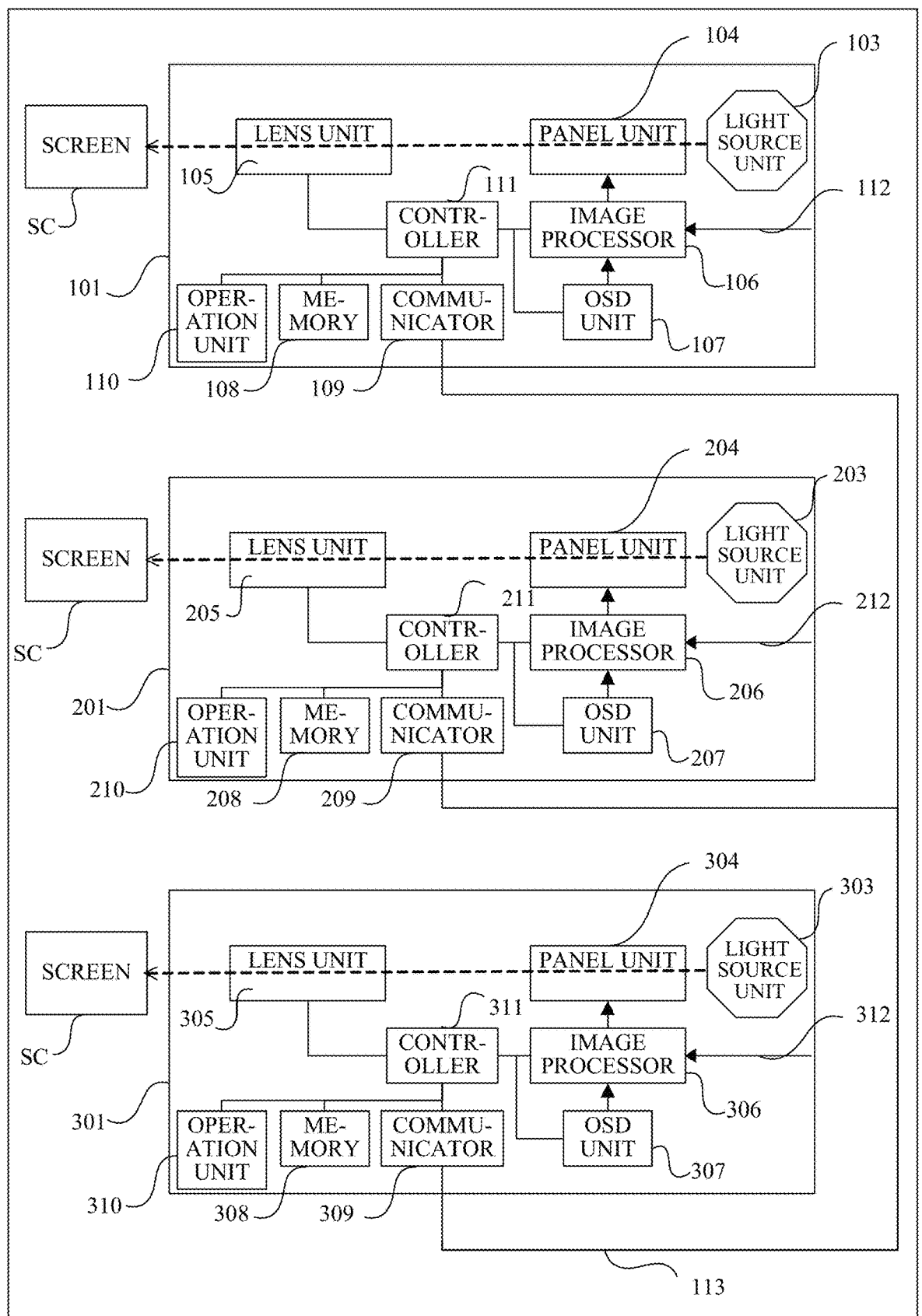
FIG. 1 illustrates a configuration of a multi-display system according to a first embodiment of the present invention.

FIG. 1 illustrates a configuration of a multi-display system (multi-apparatus system) 100 according to a first embodiment of the present invention. The multi-display system 100 includes a plurality of (three in this embodiment) projectors (image display apparatuses) 101, 201, and 301 as controllable apparatuses.

A projector 101 has a light source unit 103 including a discharge lamp or a solid-state light source (laser element or the like), a panel unit 104 such as a liquid crystal panel and a digital micromirror device as a light modulation element, and an image processor 106 that processes a video signal from the outside. The image processor 106 generates a panel driving signal according to the input video signal and supplies it to the panel unit 104. The panel unit 104 operates so as to modulate the illumination light from the light source unit 103 according to the panel driving signal. The image light modulated by the panel unit 104 is magnified by a lens unit 105 and projected on a screen SC. Thereby, a projection image 102 is displayed on the screen SC. The lens unit 105 has a focusing function, a zooming function, an aperture adjusting function, and a lens shifting function.

A plurality of panel units 104 may be provided so as to correspond to a plurality of color light beams such as R, G, and B, and to modulate each color light, or a plurality of color lights may be modulated in a time-series manner by a single panel unit 104.

An on-screen display (OSD) unit 107 generates and supplies to the image processor 106 an OSD image signal for displaying an OSD image including a menu (referred to as an OSD menu hereinafter) for the user to perform various settings and adjustments, a pointer, various messages, charts, and the like. The image processor 106 generates a panel driving signal according to the OSD image signal and supplies the panel driving signal to the panel unit 104. Thereby, the OSD image is displayed on the screen SC together with the projection image or separately from the projection image.

A memory 108 stores various setting values, state values, computer programs, and the like. A communicator 109 communicates with other projectors 201 and 301 via a wireless or wired communication line 113. An operation unit 110 has operation members such as buttons and dials, and accepts user operations (referred to as user operations hereinafter) on operation members. The operation unit 110 may be provided integrally with the projector 101, or may be provided as a remote controlling device separate from the projector 101. The controller 111 controls an overall operation of the projector 101 according to a signal from the operation unit 110 that is operated by the user.

Each of the other projectors 201 and 301 has the same configuration as the projector 101, and the same elements as those in the projector 101 in the projectors 201 and 301 will be respectively designated by replacing with first number 1 of the reference numerals of the elements of the projector 101 with 2 and 3. The number of projectors is not limited to three, and may be two or more.

Figure 2:
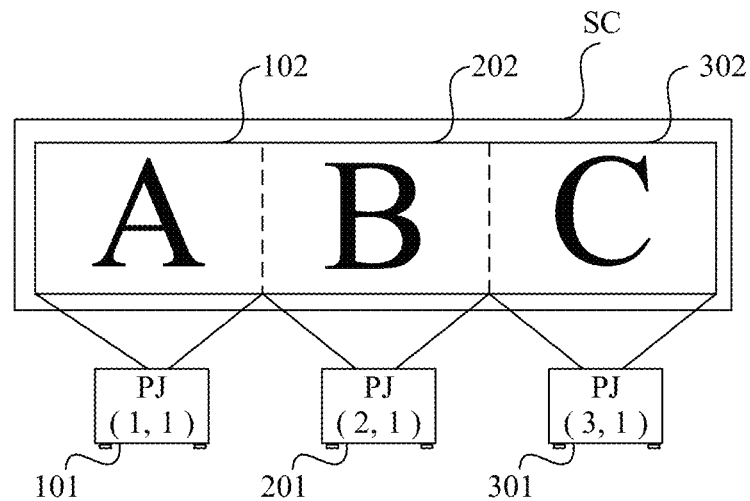
FIG. 2 illustrates a plurality of laterally arranged projectors.
Figure 3:
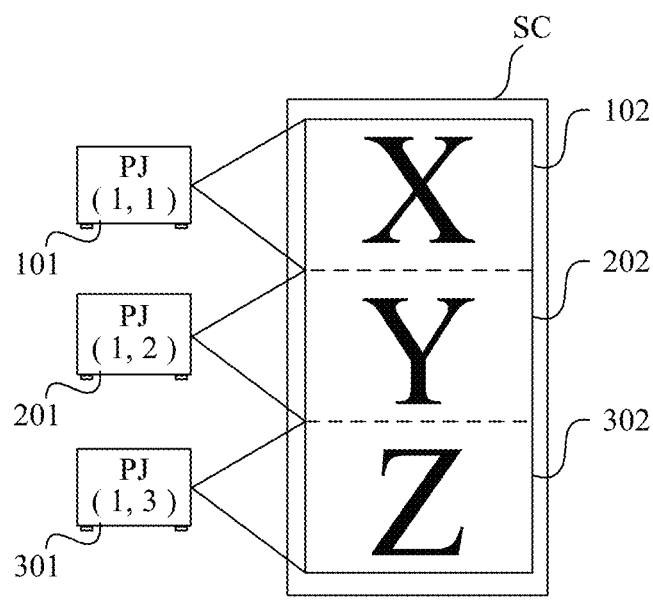
FIG. 3 illustrates a plurality of vertically arranged projectors.
Figures 4, 5:
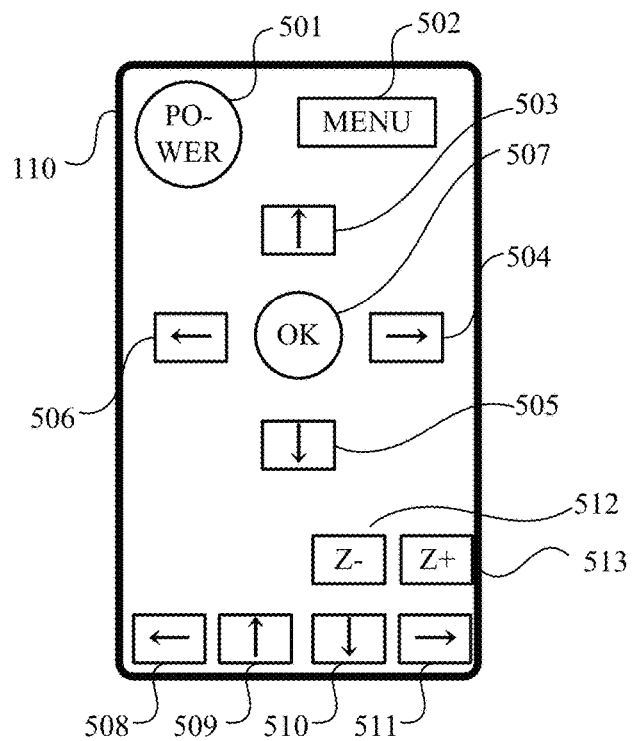
FIG. 4 illustrates projector arrangement information in the case of FIG. 2.
FIG. 5 illustrates a configuration of an operation unit according to the first embodiment.

FIG. 2 illustrates a multi-display system in which three laterally arranged projectors 101, 201, and 301 display projection images 102, 202, and 302, respectively, and FIG. 3 illustrates a multi-display system in which three vertically arranged projectors 101, 201, and 301 display projection images 102, 202, and 302, respectively. For the three projectors 101, 201, and 301, information indicating the number of projectors, an arrangement direction, an arrangement order, and a rotation is generated as information on their arrangement (referred to as projector arrangement information hereinafter), as illustrated in FIG. 4.

Figures 10, 11:
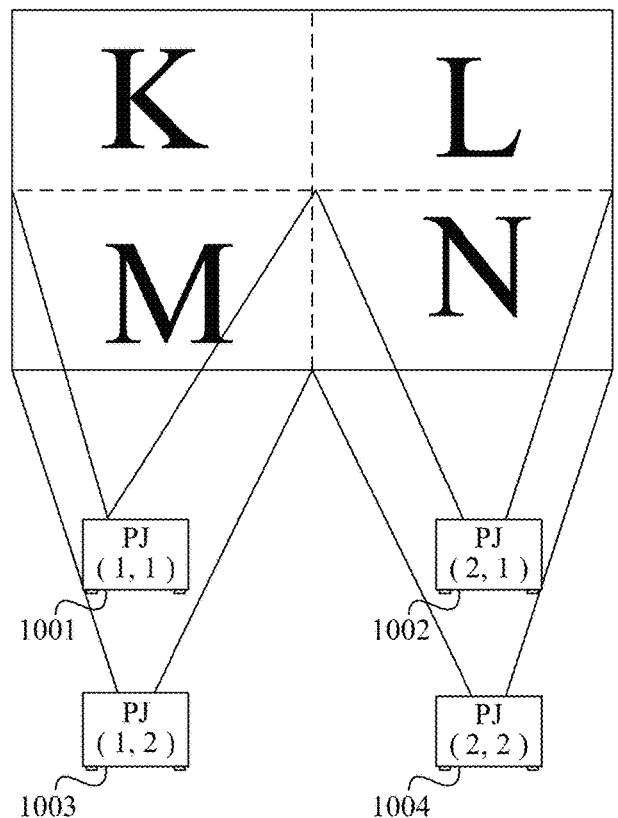
FIG. 10 illustrates a plurality of projectors arranged like a grid.
FIG. 11 illustrates an IP address according to the second embodiment.

The arrangement direction is lateral as illustrated in FIG. 2 and vertical as illustrated in FIG. 3. The arrangement order is shown by (X, Y), where X is the lateral order and Y is the vertical order. When the arrangement direction is the lateral direction, the arrangement order is (1, 1), (2, 1), and (3, 1), and when the arrangement direction is the vertical direction, the arrangement order is (1, 1), (1, 2) and (1, 3). As illustrated in FIG. 10, the arrangement direction has a lattice in which the lateral arrangement and vertical arrangement are combined, and the arrangement order at this time is (1, 1), (1, 2), (2, 1), and (2, 2). The lattice includes not only the n×n square lattice illustrated in FIG. 10 but also n×m (n≠m).

The rotation information indicates an installed orientation of each projector such as a flat placement (0 degree), a vertical orientation (90°), and a ceiling mount (180°). The projector arrangement information when three vertically oriented projectors 101, 201, and 301 are laterally arranged as illustrated in FIG. 13 is as illustrated in FIG. 14. If the arrangement direction of the projectors 101, 201, and 301 is different from that of the projection images 102, 202, and 302 on the screen SC, the arrangement direction of the projection images may be set to the arrangement direction information.

Such projector arrangement information may be generated by the user inputting information on the number of projectors, the arrangement direction, the arrangement order, and the rotation, or may be generated from adjacent information detected from an adjacency status between each projector and another adjacent projector or information obtained by detecting a rotation (installed) orientation of itself. The adjacency information can be detected by a connection sensor or an adjacency sensor provided at a plurality of locations of each projector, and can also be detected by detection processing from a captured image obtained by a camera capturing the multi-display system. The rotation state may be detected by a gravity sensor provided to each projector.

The projector arrangement information is stored in the memory 108 together with unique identification information of each projector and connection detection information between the projectors. The identification information is used to identify a model or manufacturing number of each projector, or given only within the three projectors. When the arrangement direction of the projectors 101, 201, and 301 and the arrangement direction of the projection images 102, 202, and 302 on the screen SC coincide with each other, the connection detection information can be used as the arrangement direction information.

FIG. 5 illustrates the appearance of the operation unit 110 provided in the projector 101 as the main (parent) projector. In this embodiment, the projector 101 and the projectors 201 and 301 as sub (child) projectors are controlled according to a user operation on the operation unit 110. As described above, the operation unit 110 may be provided as a remote control device separate from the projector 101.

The operation unit 110 includes a power button 501 for turning on/off the power of the projector, a menu button 502 for displaying an OSD menu on the projector, direction buttons 503 to 506 for instructing up, right, down, and left, an OK button 507 for instructing a decision, and left, upper, lower, and right switching buttons 508 to 511 for switching a projector to be controlled (control target apparatus: referred to as a control target projector hereinafter) among the projectors 101, 201, and 301 to the left, upper, lower, and right. The operation unit 110 further includes a zoom-out button 512 and a zoom-in button 513 that cause the control target projector to zoom in and out (optical zoom or electronic zoom) of the projection image. The operation unit 110 serves as a detection unit that detects the user operation of the buttons 501 to 513.

The memory 108 stores the identification information of the projectors 101, 201, and 301, the projector arrangement information, and the connection detection information, as described above. A controller 111 selects a control target projector according to a user operation (input) detected by the operation unit 110, or controls for adjustment when the control target projector is the projector 101 (referred to as an adjustment control hereinafter), or makes a communication for causing another control target projector to perform an adjustment control via the communicator 109. The adjustment here means adjusting the luminance, contrast, sharpness, or other image quality items of the projection image by controlling the image processor 106 or the panel unit 104, and focusing, zooming, aperture adjusting and lens shifting in the lens unit 105 (position of the projected image). In this embodiment, the operation unit 110, the memory 108, and the controller 111 constitute an operation device.

Figure 6:
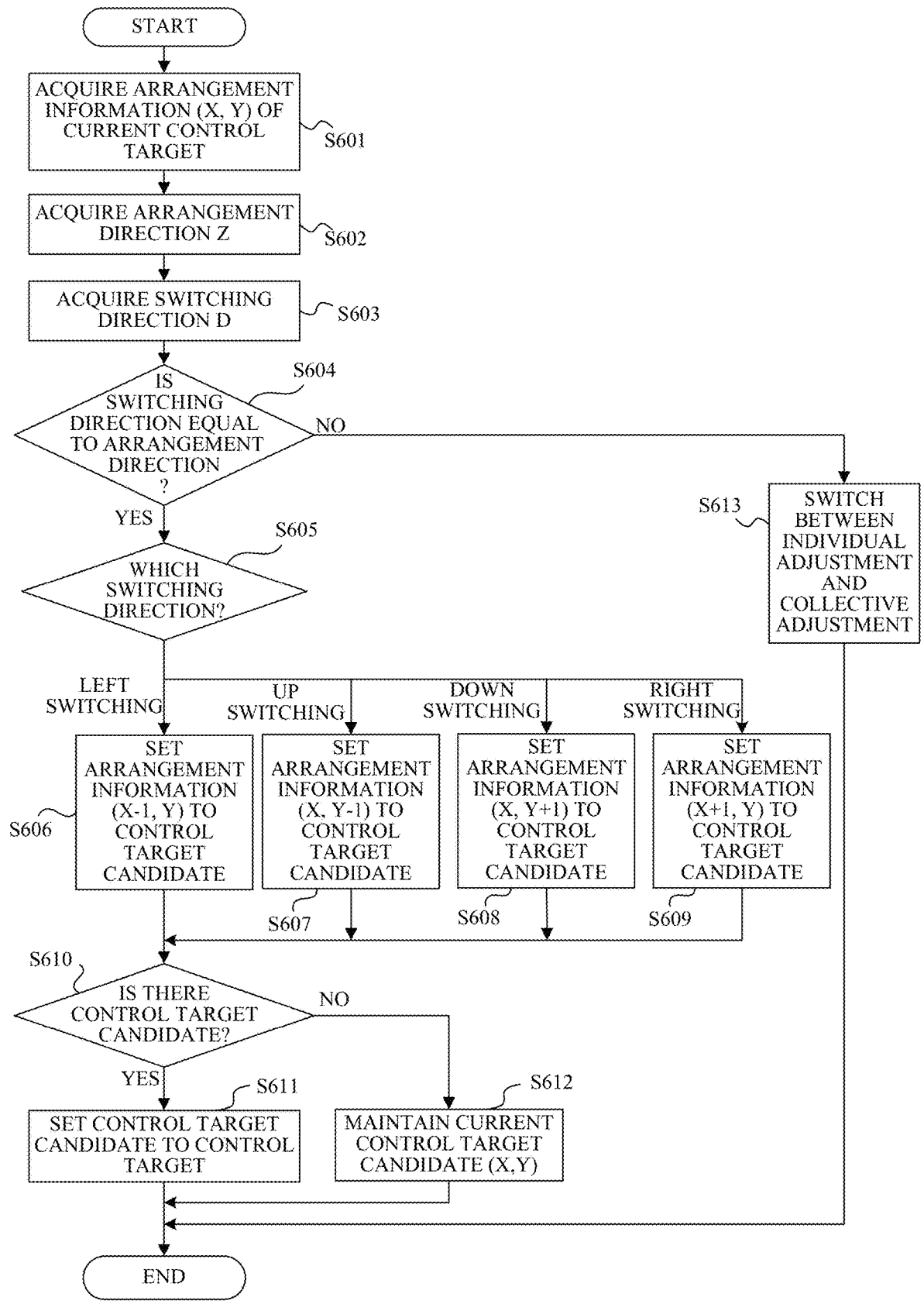
FIG. 6 shows a flowchart showing processing according to the first embodiment.

FIG. 6 shows processing executed by the controller 111 as a computer according to a computer program. In the step S601, the controller 111 acquires an arrangement order (X, Y) from the currently control target projector.

Next, in the step S602, the controller 111 acquires arrangement directions Z (horizontal, vertical, or grid) of all projectors.

Next, in the step S603, the controller 111 acquires a switching direction D input by a user operation on any of the switching buttons 508 to 511.

Next, in the step S604, the controller 111 determines whether or not the switching direction D is the direction corresponding to the arrangement direction Z (the same direction). If it is the corresponding direction, it proceeds to the step S605, and if not, it proceeds to the step S613. For example, when the arrangement direction Z is lateral, the switching direction D input by the user operation through the switching buttons 508 and 511 is the same direction, and when the arrangement direction Z is vertical, the switching direction D input by the user operation through the switching buttons 509 and 510 is the same direction. When the arrangement direction Z is a grid, the switching direction D input by the user operation through any of the switching buttons 508 to 511 is the same direction.

Next, from the step S605 to the step S609, the controller 111 selects a candidate projector that is a candidate for the next control target projector according to the switching direction D. More specifically, when a switch to the left is input by the user operation through the switch button 508, the controller 111 selects a projector whose arrangement order is (X−1, Y) as a new candidate projector in the step S606. When up, down, or right switching is input by the user operation through the switching buttons 509 to 511, projectors whose arrangement orders of (X, Y+1), (X, Y−1) or (X+1, Y) are selected as new candidate projectors in the step S607, S608, or S609, respectively.

The controller 111 that has thus selected the candidate projectors determines in the step S610 whether or not there is a candidate projector. If it exists, the flow proceeds to the step S611, and the controller 111 sets the candidate projector selected in any of steps S606 to S609 to a new control target projector. For example, when the flow proceeds from the step S606 to the step S610, the candidate projector whose arrangement order is (X−1, Y) is set to a new control target projector. On the other hand, when there is no candidate projector, the controller 111 proceeds to the step S612 and sets the current controlled projector again to a new controlled projector.

Thereafter, when the control target projector is the projector 101, the controller 111 performs the adjustment control for the projector 101 according to the user operation through the buttons 502 to 503 or 512 and 513. When the control target projector is the projector 201 or 301, the control target projector is caused to perform the adjustment control according to the user operation through the buttons 502 to 503 or 512 and 513. Then, the controller 111 ends this processing.

When the switching direction D does not correspond to the arrangement direction Z in the step S604 (not the same direction), the controller 111 that has proceeded to the step S613 switches between an individual adjustment control only for the selected control target projector among the projectors 101, 201, and 301 (referred to as individual adjustment hereinafter) and a collective adjustment control of all projectors 101, 201, and 301 (referred to as a collective (or batch or simultaneous) adjustment hereinafter). That is, when the individual adjustment is currently set, it is switched to the collective adjustment, and when the collective adjustment is currently set, it is switched to the individual adjustment. In the collective adjustment, the controller 111 performs the adjustment control of the projector 101 according to the user operation through the buttons 502 to 503 or 512 and 513, and causes the projectors 201, 301 to perform the adjustment control via the communicators 109, 209, and 309. Then, the controller 111 ends this processing.

In this embodiment described above, for example, the individual adjustment of the projector 101 as the control target projector is currently set, and the three projectors 101, 201, and 301 are laterally arranged as illustrated in FIG. 2. When the user operates the right switching button 511 on the operation unit 110, the control target projector is switched to the projector 201. When the projectors 101, 201, and 301 share the projector arrangement information illustrated in FIG. 4, the projectors 201 and 301 can recognize from the projector arrangement information that they have been selected as the control target projectors. The projector arrangement information is shared among the projectors 101, 201, and 301 by the user inputting the projector arrangement information to each projector, or by transmitting and receiving data of the projector arrangement information among the projectors 101, 201, and 301.

When the individual adjustments to the projectors 101, 201, and 301 are switched to the collective adjustment, all the projectors 101, 201, and 301 may accept the user operation for the adjustment control of the operation units 110, 210, and 310.

The operation of individually or collectively adjusting projectors may be configured such that a single projector accepts the operation and notifies the other projectors of the operation contents, or of the adjustment contents.

Switching of the control target projector and switching between the individual adjustment and the collective adjustment can be performed even while the adjustment menu is displayed. Thereby, for example, the image quality adjustment can be performed while the control target projector is switched. This is similarly applied when the input switching menu is being displayed or the test pattern is being displayed.

Second Embodiment

Figure 7:
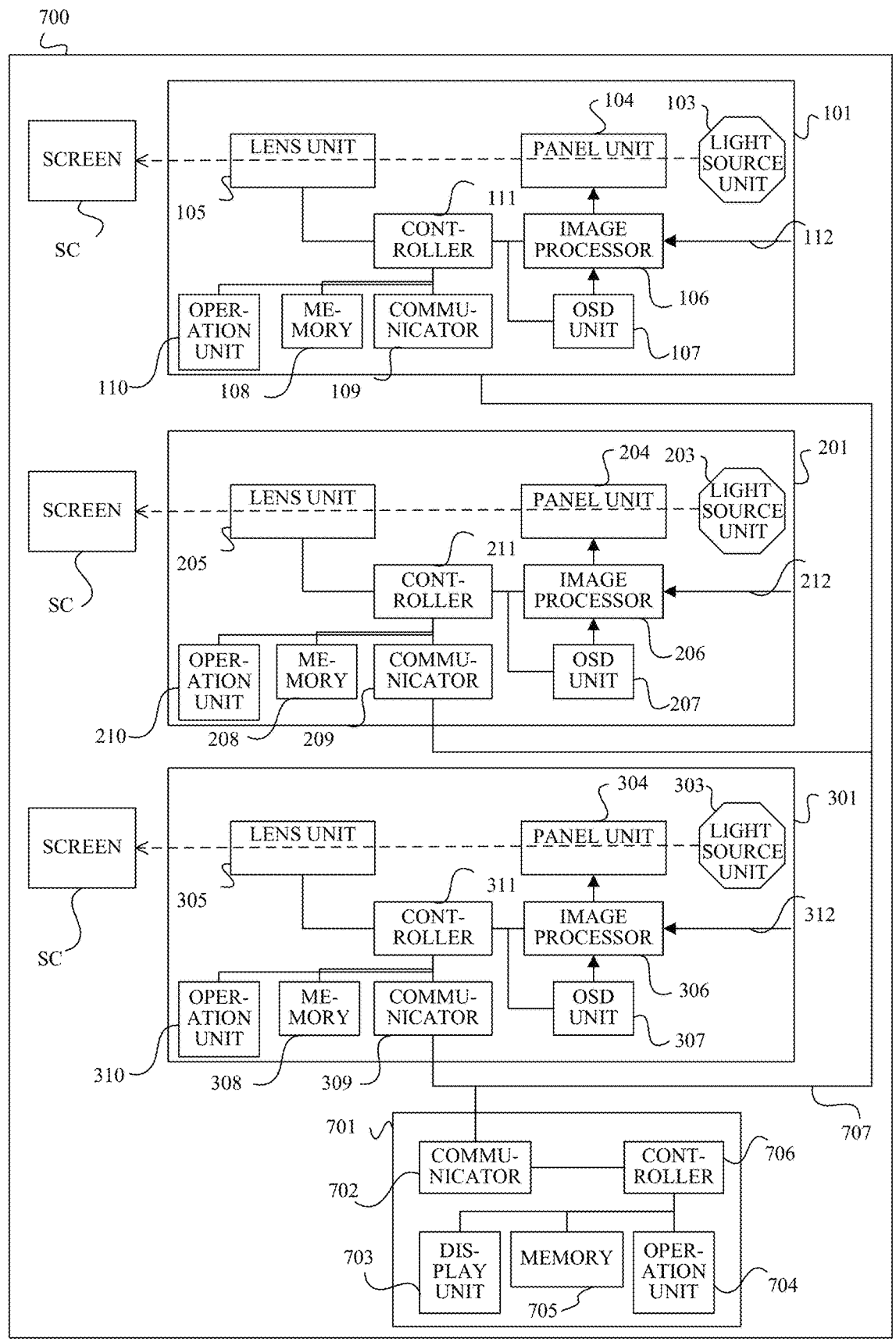
FIG. 7 illustrates a configuration of a multi-display system according to a second embodiment of the present invention.

FIG. 7 illustrates a configuration of a multi-display system 700 according to a second embodiment of the present invention. The multi-display system 700 includes three projectors 101, 201, and 301 and a terminal device 701 serving as an operation apparatus. In this embodiment, the projectors 101, 201 and 301 are caused to perform the adjustment controls through the terminal device 701. The configurations of the projectors 101, 201, and 301 are the same as those in the first embodiment.

The terminal device 701 includes a communicator 702, a display unit 703, an operation unit 704, a memory 705, and a controller 706, and is configured as, for example, a tablet computer or a smartphone. The communicator 702 communicates with the projectors 101, 201, and 301 via a wireless or wired communication line 707. The display unit 703 is a flat display such as liquid crystal or organic EL, and the operation unit 704 is a touch sensor such as a digitizer. The actual operation unit 704 is disposed so as to overlap the display unit 703, and the user can operate the operation unit 704 with a finger or the like while watching the display on the display unit 703.

The memory 705 stores the projector arrangement information described in the first embodiment together with the computer program and various set values. The controller 706 controls the terminal device 701 according to the computer program, or causes the projectors 101, 201, and 301 to perform the adjustment controls via the communicator 702.

The controller 706 performs the same control processing as the processing illustrated in FIG. 6 executed by the controller 111 in the first embodiment for the adjustment controls over the projectors 101, 201, and 301. Since the operation unit 704 as a touch sensor is provided in the terminal device 701, the controller 706 must detect the direction of a swipe operation (such as a finger sliding operation) as the user operation on the touch sensor. Therefore, in the step S603 in FIG. 6, the controller 706 acquires the direction of the swipe operation (referred to as a swipe direction hereinafter) as the switching direction D. Then, in the step S604, the controller 706 determines whether or not the swipe direction corresponds to the arrangement direction Z. The direction corresponding to the arrangement direction Z in this embodiment includes a direction that is the same as or close to the arrangement direction Z. In the step S604, if the swipe direction is not the direction corresponding to the arrangement direction Z, the flow proceeds to the step S613 to switch between the individual adjustment and the collective adjustment.

Unlike the controller 111 according to the first embodiment, the controller 706 is not provided to the projector 101 and thus, similar to the other projectors 201 and 301, makes a communication for causing the projector 101 to perform the adjustment control according to the setting of the control target projector or the collective adjustment setting.

Figures 8A, 8B, 8C:
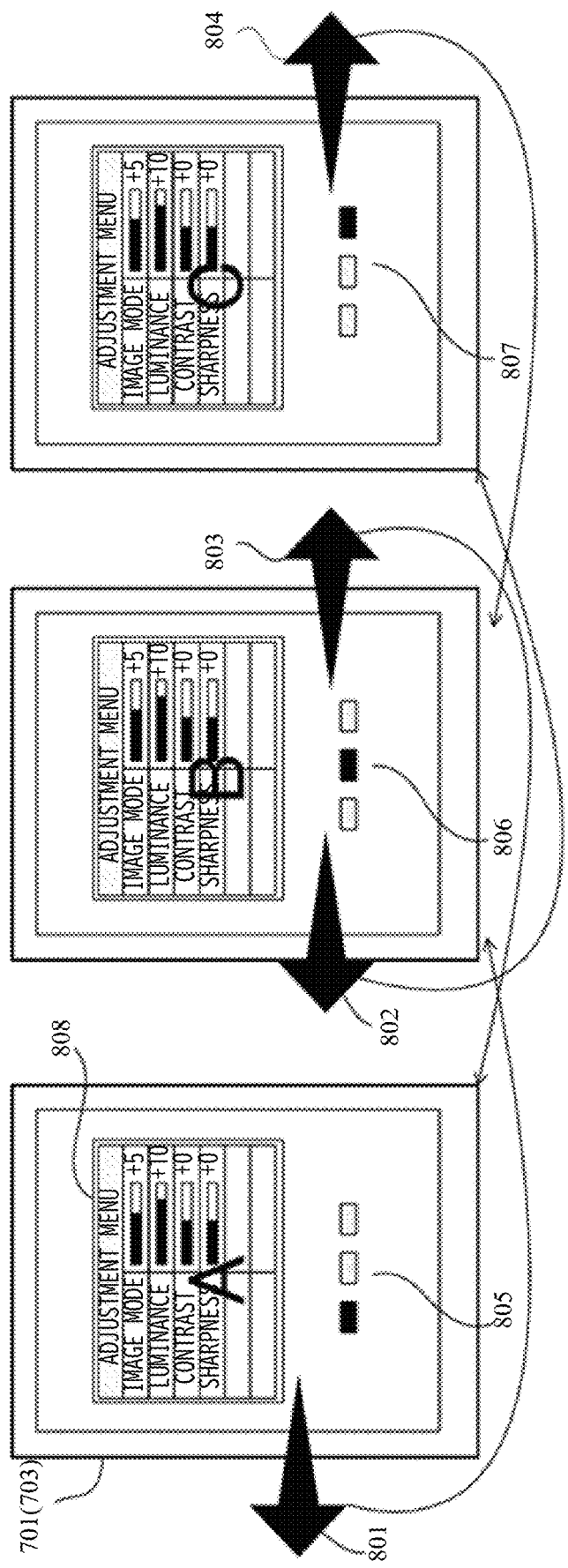
FIGS. 8A to 8C illustrate one example showing operations and displays of a terminal device according to the second embodiment.

FIG. 8A illustrates a display example on the display unit 703 in the terminal device 701. Here, a display example is illustrated in which the projectors 101, 201, and 301 are laterally arranged as illustrated in FIG. 2. A navigation icon 805 and an adjustment menu 808 are displayed on the display unit 703. The navigation icon 805 has three rectangular, laterally arranged frames corresponding to the arrangement of the three projectors 101, 201, and 301, and the position of the control target projector (or which projector is a control target projector) through the position of the rectangular frame in inverted black. The adjustment menu 808 displays the luminance, contrast, sharpness, or other image quality item setting values (adjustment states) of the control target projector.

FIGS. 8A to 8C and 9A to 9D show relationships between the swipe direction for the operation unit 704 on the display unit 703 and the display on the display unit 703. FIG. 8A displays the navigation icon 805 showing that the projector 101 is currently set to the control target projector, and the adjustment state of the projector 101. In this state, when the swipe operation is performed to left 801 corresponding to the arrangement direction, the display of the navigation icon 805 and the adjustment menu 808 is switched as illustrated in FIG. 8B. This allows the user to confirm the fact that the projector 201 is currently set to the control target projector and the adjustment state of the projector 201.

When left 802 is swiped further in the state of FIG. 8B, the display of the navigation icon 805 and the adjustment menu 808 is switched as illustrated in FIG. 8C. This allows the user to confirm the fact that the projector 301 is currently set to the control target projector and the adjustment state of the projector 301. When the swipe operation is performed to rights 803 and 804 corresponding to the arrangement directions in the states of FIGS. 8B and 8C, the displays of the navigation icon 805 and the adjustment menu 808 are switched as illustrated in FIGS. 8A and 8B.

When the individual adjustment illustrated in FIGS. 9A to 9C similar to FIGS. 8A to 8C are set and the swipe operation is performed to lower 901 or upper 902 that does not correspond to the arrangement direction, the display of the navigation icon 805 and the adjustment menu 808 is switched as illustrated in FIG. 9D. This allows the user to confirm the fact that the individual adjustments to the projectors 101, 201, and 301 have been switched to the collective adjustment and the adjustment state of the collective adjustment. In the state illustrated in FIG. 9D, when the swipe operation is performed for the lower 903 or the upper 904, the display of the navigation icon 805 and the adjustment menu 808 is switched to the display of the individual adjustment before switching to the collective adjustment in FIGS. 9A to 9C. Even if the left and right swipe operations are performed from the state of FIG. 9D, the switch to the individual adjustment is not performed.

Adjustment items for the individual adjustment and the collective adjustment are suitable for them. FIGS. 8A to 8C and 9A to 9C are similar for drawing convenience, but they are different originally.

As described above, the switching of the control target projector and the switching between the individual adjustment and the collective adjustment can be operated even while the adjustment menu 808 is displayed. The input position of the swipe operation is determined by determining whether there is an input to the outside the adjustment item area of the adjustment menu 808. Thereby, for example, the image quality can be adjusted while the control target projector is being switched. This is similarly applicable when the input switching menu is being displayed or the test pattern is being displayed.

When the projectors 101, 201, and 301 are vertically arranged as illustrated in FIG. 3, the navigation icons 805 are also displayed as three vertically arranged rectangular frames, and the position of the control target projector is displayed according to the position of the black inverted rectangular frame. Then, the display of the control target projector and the adjustment menu is switched according to the vertical swipe operation, and the individual adjustment and the collective adjustment are switched according to the horizontal swipe operation.

This embodiment may adopt the following method as a method of switching the control target projector by communications. FIG. 11 illustrates the IP address of each projector stored in the memory 705 together with the identification information, the projector arrangement information, and the connection detection information. When the control target projector is switched as a communication partner, an IP address of the communication partner may be switched. In the collective adjustment, all the projectors may be set to the communication partners by the broadcast communication, or communications may be made with all the projectors while the IP address is sequentially and individually switched.

As yet another method, the broadcast communications may be always made with all projectors, and the identification information for identifying the control target projector may be included in the communication packet. For example, a communication packet illustrated in FIG. 12 may be defined. This communication packet includes identification information (ID) of a terminal device as transmission source ID 1201, transmission destination ID 1202, a command 1203, and error detecting data 1204. As the ID, in addition to the IDs of individual projectors, IDs that mean all projectors (such as 0xFFFFFFFF) are also prepared. By storing the ID of the control target projector in the destination ID, the received projector can recognize that it has been set to the control target projector. This is similarly applicable when all projectors are set to control target projectors in the collective adjustment.

In each of the above embodiments, a multi-display system including a plurality of projectors has been described, but a device system including a plurality of other controllable apparatuses may be configured.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processor (CPU), microprocessor (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to each of the embodiments, a user can easily control a plurality of control target apparatuses.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-183836, filed on Oct. 4, 2019, which is hereby incorporated by reference herein in its entirety.

What is claimed is:

1. An operation apparatus through which a user operation is performed to control a plurality of controllable apparatuses, the operation apparatus comprising:
a detector configured to detect the user operation;
a display unit configured to display an adjustment menu used for controlling the plurality of controllable apparatuses; and
a controller configured to acquire information on an arrangement of the plurality of controllable apparatuses, to switch a control target apparatus among the plurality of controllable apparatuses when a user operation is detected which inputs a direction corresponding to an arrangement direction of the plurality of controllable apparatuses indicated by the information on the arrangement, and to switch between an individual control and a collective control for the plurality of controllable apparatuses in accordance with a user operation,
wherein the display unit displays the information on the arrangement of the plurality of controllable apparatuses and information on the control target apparatus among the plurality of controllable apparatuses.

2. The operation apparatus according to claim 1, wherein the controller acquires identification information from each of the plurality of controllable apparatuses and stores the identification information and the information on the arrangement in a memory.

3. The operation apparatus according to claim 1, wherein the detector detects an operation of an operation member provided in a direction corresponding to the arrangement direction.

4. The operation apparatus according to claim 1, wherein the detector detects a swipe operation relative to a touch sensor.

5. The operation apparatus according to claim 1, wherein the information on the arrangement includes information indicating installed orientations of the plurality of controllable apparatuses.

6. The operation apparatus according to claim 1, wherein each of the plurality of controllable apparatuses is an image displaying apparatus.

7. A multi-apparatus system comprising:
an operation apparatus through which a user operation is performed to control a plurality of controllable apparatuses, the operation apparatus including a detector configured to detect the user operation, and a display unit configured to display an adjustment menu used for controlling the plurality of controllable apparatuses;
a controller configured to acquire information on an arrangement of the plurality of controllable apparatuses, to switch a control target apparatus among the plurality of controllable apparatuses when a user operation is detected which inputs a direction corresponding to an arrangement direction of the plurality of controllable apparatuses indicated by the information on the arrangement, and to switch between an individual control and a collective control for the plurality of controllable apparatuses in accordance with a user operation; and
the plurality of controllable apparatus controlled by the operation apparatus,
wherein the display unit displays the information on the arrangement of the plurality of controllable apparatuses and information on the control target apparatus among the plurality of controllable apparatuses.

8. A method for controlling an operation apparatus through which a user operation is performed to control a plurality of controllable apparatuses, the method comprising the steps of:
acquiring information on an arrangement of the plurality of controllable apparatuses;
displaying information on the arrangement of the plurality of controllable apparatuses and information on a control target apparatus among the plurality of controllable apparatuses;
detecting the user operation;
switching the control target apparatus among the plurality of controllable apparatuses when a user operation is detected which inputs a direction corresponding to an arrangement direction of the plurality of controllable apparatuses indicated by the information on the arrangement; and
switching between an individual control and a collective control for the plurality of controllable apparatuses in accordance with a user operation.

9. A non-transitory computer-readable storage medium storing a computer program for causing a computer in an operation apparatus through which a user operation is performed to control a plurality of controllable apparatuses to execute the control method according to claim 8.

10. An operation apparatus through which a user operation is performed to control a plurality of image displaying apparatuses, the operation apparatus comprising:
a detector configured to detect the user operation;

a display unit configured to display an adjustment menu used for controlling a control target apparatus among the plurality of image displaying apparatuses; and a controller configured to
- acquire information on an arrangement of a plurality of projection images projected from the plurality of image displaying apparatuses, and
- to switch the control target apparatus among the plurality of image displaying apparatuses when a user operation is detected which inputs a direction corresponding to an arrangement direction of the plurality of projection images indicated by the information on the arrangement, wherein the display unit displays the information on the arrangement of the plurality of projection images and information on the control target apparatus among the plurality of image displaying apparatuses.

11. A method for controlling an operation apparatus through which a user operation is performed to control a plurality of image displaying apparatuses, the method comprising the steps of:
- acquiring information on an arrangement of a plurality of projection images projected from the plurality of image displaying apparatuses;
- displaying the information on the arrangement of the plurality of projection images and information on a control target apparatus among the plurality of image displaying apparatuses;
- detecting the user operation; and switching the control target apparatus among the plurality of image displaying apparatuses when a user operation is detected which inputs a direction corresponding to an arrangement direction of the plurality of projection images indicated by the information on the arrangement.

\* \* \* \* \*